US011220011B2

(12) United States Patent
Sakurai et al.

(10) Patent No.: US 11,220,011 B2
(45) Date of Patent: Jan. 11, 2022

(54) MULTI-JOINTED WELDING ROBOT

(71) Applicant: Kobe Steel, Ltd., Kobe (JP)

(72) Inventors: Yasuharu Sakurai, Fujisawa (JP); Yuki Shika, Ibaraki (JP); Motoaki Murakami, Fujisawa (JP); Taichi Igarashi, Fujisawa (JP); Tatsuji Minato, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 16/478,909

(22) PCT Filed: Jan. 25, 2018

(86) PCT No.: PCT/JP2018/002347
§ 371 (c)(1),
(2) Date: Jul. 18, 2019

(87) PCT Pub. No.: WO2018/143055
PCT Pub. Date: Aug. 9, 2018

(65) Prior Publication Data
US 2019/0381596 A1 Dec. 19, 2019

(30) Foreign Application Priority Data

Feb. 1, 2017 (JP) .............................. JP2017-017109

(51) Int. Cl.
*G05B 19/4155* (2006.01)
*B25J 15/00* (2006.01)
(Continued)

(52) U.S. Cl.
CPC ........... *B25J 15/0019* (2013.01); *B23K 9/133* (2013.01); *B25J 17/0258* (2013.01); *B25J 18/00* (2013.01);
(Continued)

(58) Field of Classification Search
CPC ................ B25J 19/0025; B25J 19/0029; B25J 19/0041; B23K 11/314; B23K 26/0889; B23K 26/0884
(Continued)

(56) References Cited

U.S. PATENT DOCUMENTS 8,288,687 B2 * 10/2012 Inoue ..................... B23K 9/295
219/136
8,863,606 B2 * 10/2014 Ichibangase ......... B25J 17/0283
74/490.01
(Continued)

FOREIGN PATENT DOCUMENTS

JP      2003-503222 A    1/2003
JP        3488899 B2     1/2004
(Continued)

OTHER PUBLICATIONS

International Search Report dated Mar. 27, 2018 in PCT/JP2018/002347 filed Jan. 25, 2018.

*Primary Examiner* — Bobby Rushing, Jr.
(74) *Attorney, Agent, or Firm* — Oblon, McClelland, Maier & Neustadt, L.L.P.

(57) ABSTRACT

Provided is a multi-jointed welding robot that includes: a rotating part that is rotatably provided on a base that is fixed to an installation surface; and a multi-jointed arm that is coupled to the rotating part via a first driving shaft and has a plurality of arm parts. An opening is formed in the rotating part through which a routing member, which is routed inside the rotating part, is guided from part of the rotating part toward the side opposite the installation surface. A guide member guides the routing member, which has one end fixed to the opening and which is guided through the opening, toward the installation surface from the other end of the routing member while bending the routing member.

9 Claims, 14 Drawing Sheets

(51) Int. Cl.
   *B23K 9/133*   (2006.01)
   *B25J 17/02*   (2006.01)
   *B25J 18/00*   (2006.01)
   *B23K 9/095*   (2006.01)
(52) U.S. Cl.
   CPC ........ *B23K 9/0953* (2013.01); *G05B 19/4155* (2013.01); *G05B 2219/45135* (2013.01)
(58) Field of Classification Search
   USPC ...................................................... 74/490.02
   See application file for complete search history.

(56) References Cited

U.S. PATENT DOCUMENTS

| | | | | |
|---|---|---|---|---|
| 8,893,577 | B2* | 11/2014 | Ibayashi | B25J 19/0025 74/490.02 |
| 9,393,703 | B2* | 7/2016 | Kume | B25J 19/0025 |
| 9,481,085 | B2* | 11/2016 | Igarashi | B25J 9/1694 |
| 2006/0104791 | A1* | 5/2006 | Nihei | B25J 19/0025 414/737 |
| 2008/0236324 | A1* | 10/2008 | Inoue | B25J 19/0025 74/490.02 |
| 2009/0120228 | A1* | 5/2009 | Larsson | B25J 9/102 74/490.02 |
| 2010/0050806 | A1* | 3/2010 | Ono | B25J 9/044 74/490.02 |
| 2012/0103125 | A1* | 5/2012 | Liu | B25J 19/0025 74/490.02 |
| 2014/0109712 | A1* | 4/2014 | Ono | B25J 9/042 74/490.02 |
| 2014/0290415 | A1* | 10/2014 | Hasuo | B25J 19/0025 74/490.02 |
| 2015/0007681 | A1* | 1/2015 | Murakami | B25J 19/0025 74/490.02 |
| 2015/0034698 | A1* | 2/2015 | Takahashi | B23K 37/02 228/33 |
| 2016/0305575 | A1* | 10/2016 | Tajer | H02G 1/00 |
| 2017/0291313 | A1* | 10/2017 | Inoue | B25J 17/00 |

FOREIGN PATENT DOCUMENTS

| | | |
|---|---|---|
| JP | 2006-304559 A | 11/2006 |
| JP | 2008-238320 A | 10/2008 |
| JP | 2015-6683 A | 1/2015 |
| JP | 5715198 B2 | 5/2015 |

* cited by examiner

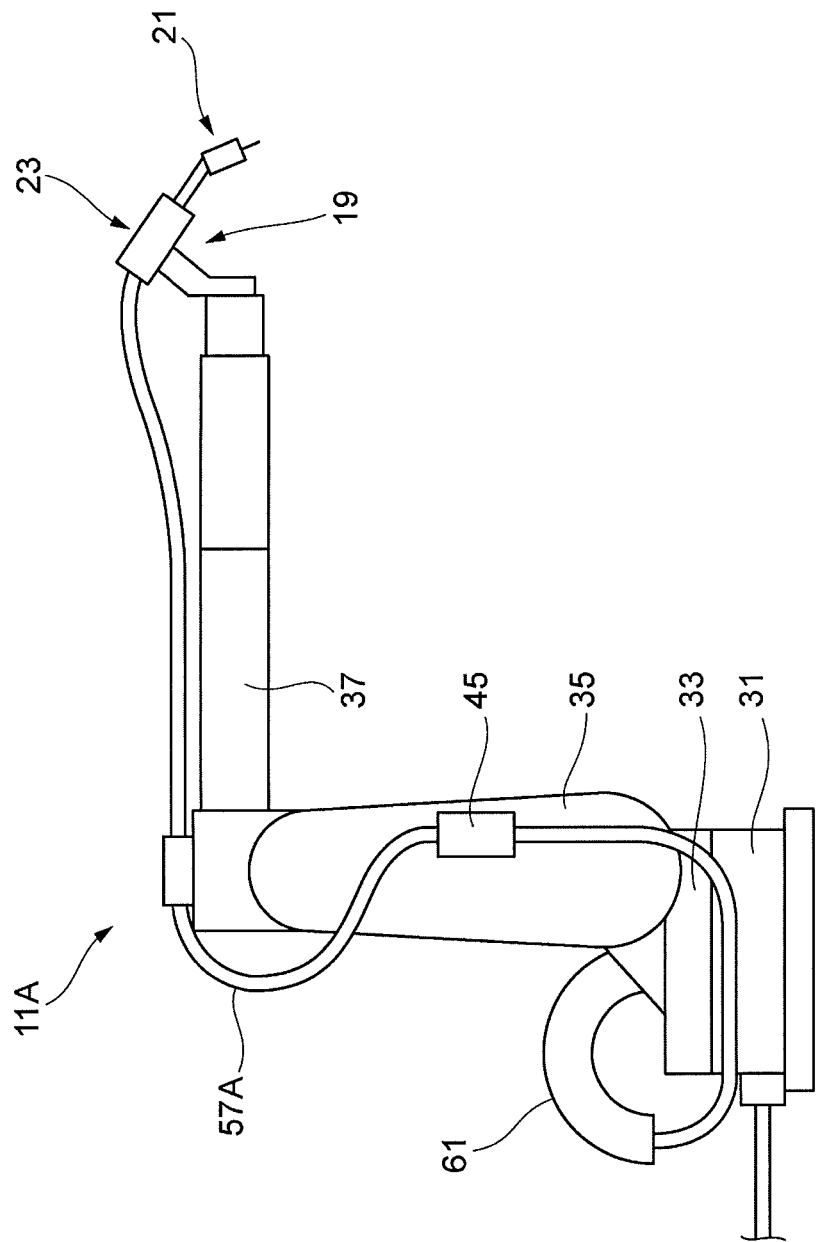

F I G. 12 A
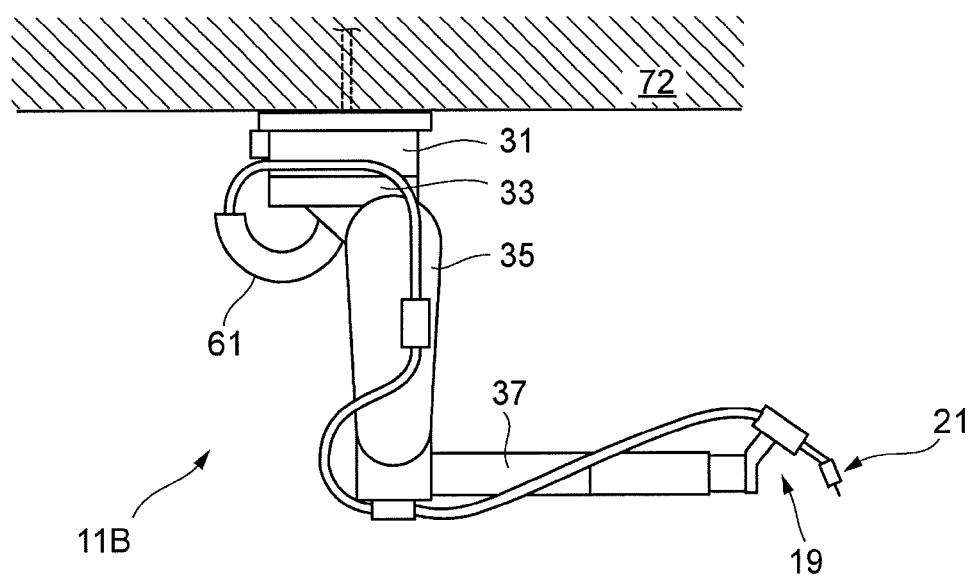

MULTI-JOINTED WELDING ROBOT

TECHNICAL FIELD

The present invention relates to a multi-jointed welding robot.

BACKGROUND ART

In general, a multi-jointed welding robot for arc welding provided with a welding torch at a tip of a multi-jointed arm (for example, see Patent Documents 1, 2). The multi-jointed welding robot of Patent Documents 1, 2 is provided with a pivot part pivotably provided on a base, an arm provided in a rotation drivable manner in an upper portion of the pivot part, and a welding torch attached to a tip of the arm. In the multi-jointed robot, the pivot part and the respective joints of the arm are driven, whereby a desired welding process operation is possible.

In the multi-jointed welding robot, in addition to a driving cable for driving the pivot part and the respective joints of the arm, a power cable for supplying welding current, and a conduit cable through which a welding wire is inserted, various cables, hoses and the like such as a hose for sending shielding gas or cooling water are connected to the welding torch.

CITATION LIST

Patent Document

Patent Document 1: JP 5715198 B
Patent Document 2: JP 2488899 B

SUMMARY OF THE INVENTION

Problem to be Solved by the Invention

By the way, routing members routed along the robot such as the above welding wire, cables, hoses and the like are limited in acceptable minimum bending radius according to their material. For example, if the bending radius of the welding wire is set smaller than the minimum bending radius, a bending tendency is imparted to the welding wire, and unintended positional deviation is caused in a tip position (welding position) of the welding wire during welding. As a result, a reduction in weld quality may be caused. Moreover, similarly, a bending tendency might be imparted to the cables and the hoses and they might be damaged.

Then, when the routing members are arranged along the multi-jointed welding robot, it is conceivable that a center distance of driving shafts for driving the respective joints is widened and an operating range of the arm is reduced such that the bending radius of the routing member can be kept large.

However, if the center distance is widened, the size of the robot is increased and concern about an increase in cost arises. Moreover, constraints to the installation location of the robot due to an increase in size may be increased. Further, reduction of the operating range of the arm due to the increase in size of the robot decreases convenience of the robot.

Moreover, although it is conceivable that the routing members are arranged away from the pivot part and the arm, in that case, during the operation of the multi-jointed welding robot, the routing members are prone to interfere with the surroundings thereof, and the routing members are prone to be damaged.

On the other hand, in a case where the routing members are arranged in the vicinity of the pivot part and the arm, the routing members may be bent with a small curvature radius according to the posture of the arm. To avoid this, the height of a rotation shaft (second driving shaft) on a base end side of a lower arm connected to the pivot part having a pivot shaft (first driving shaft) from a base installation surface only has to be increased. However, in that case, the pivot part needs to be formed higher, and there is a disadvantage that the weight of the welding robot is increased. Moreover, in a case where the multi-jointed welding robot is arranged on a work, the degree of freedom of robot arrangement can be extended if the height of the second driving shaft of the robot is reduced as low as possible. However, if the pivot part is formed higher, the degree of freedom of robot arrangement is reduced.

The present invention has been made in view of the above-described matters, and an object thereof is to provide a multi-jointed welding robot capable of keeping a bending radius of routing members such as a welding wire, cables and hoses large without complicating the structure thereof, and reducing a height of a second driving shaft from a base installation surface.

Means for Solving the Problem

An aspect of the present invention is a multi-jointed welding robot having: a pivot part pivotably provided on a base fixed to an installation surface; and a multi-jointed arm coupled to the pivot part via a driving shaft and having a plurality of arm parts, the multi-jointed welding robot being characterized in that: the pivot part is formed with an opening through which routing members routed in an interior of the pivot part are led out of a part of the pivot part toward the opposite side to the installation surface; and the multi-jointed welding robot is provided with a guide member whose one end portion is fixed to the opening and which leads out the routing members, which are led out of the opening, of the other end portion toward the installation surface while curving the routing members.

According to the multi-jointed welding robot, the guide member leads the routing members, which are led out upwardly, out downwardly while curving the routing members. Thereby, the curvature radius of the routing members can be maintained large, therefore, a curling tendency of the routing members is prevented, and highly accurate welding is possible without causing unintended positional deviation and the like. Moreover, the routing members are led out of the guide member downwardly, thereby a maximum height of the pivot part can be reduced, and the height of the second driving shaft of the pivot part from the base can be further reduced. Thereby, the center of gravity of the welding robot is lowered and welding workability is improved, and the weight of the welding robot is reduced and convenience of the welding robot is increased.

Moreover, it is preferable that the guide member is a tubular member curved in a circular arc shape.

According to the configuration, the routing members are guided in a circular arc shape while being stably supported by the tubular member. If the guide member consists of one tubular member, the guide member can be simply assembled to the pivot part.

Moreover, it is preferable that the guide member includes a plurality of tubular members arranged in a circular arc shape.

According to the configuration, the guide member can be manufactured in a simple and convenient way, and it can easily support the routing members in an arbitrary curved shape.

Moreover, it is preferable that the guide member includes a supporting member curved in a circular arc shape, and a binding member which is fixed to the supporting member and binds the routing members.

According to the configuration, the guide member can be simply configured.

Moreover, it is preferable that the guide member is fixed to a pivot center part of the pivot part at the one end portion thereof.

According to the configuration, even if the pivot part pivots around the first driving shaft, the curvature radius of the routing members led out of the guide member is not changed and the routing members are not locally bent with a small curvature radius.

Moreover, it is preferable that the routing members include a welding wire inserted through a conduit cable.

According to the configuration, it is possible to prevent damage of the welding wire, and handling ability of the welding wire is improved.

Moreover, it is preferable that the routing members include, between a welding torch provided at a tip of the multi-jointed arm and the pivot part, at least any of a gas hose for supplying shielding gas, a cooling water hose for supplying cooling water, and a power cable for supplying welding current, and are inserted through one torch cable.

According to the configuration, supply of the welding wire, shielding gas, cooling water, welding current and the like to the welding torch of the welding robot can be performed with the one torch cable, without configuring a complex supply route.

Effect of the Invention

According to the present invention, a bending radius of routing members such as a welding wire, cables and hoses can be kept large without complicating the structure thereof, and a height of a second driving shaft from a base installation surface can be reduced. Thereby, weld quality is improved, and convenience of a multi-jointed welding robot is increased.

BRIEF DESCRIPTION OF DRAWINGS

FIG. 10 is a side view showing another configuration example of the multi-jointed welding robot.

FIG. 12A is a side view of the multi-jointed welding robot installed to a ceiling.

DESCRIPTION OF EMBODIMENTS

Hereinafter, embodiments of the present invention will be described in detail with reference to the drawings. It should be noted that the present invention is not limited to the embodiments to be described below.

Figure 1:
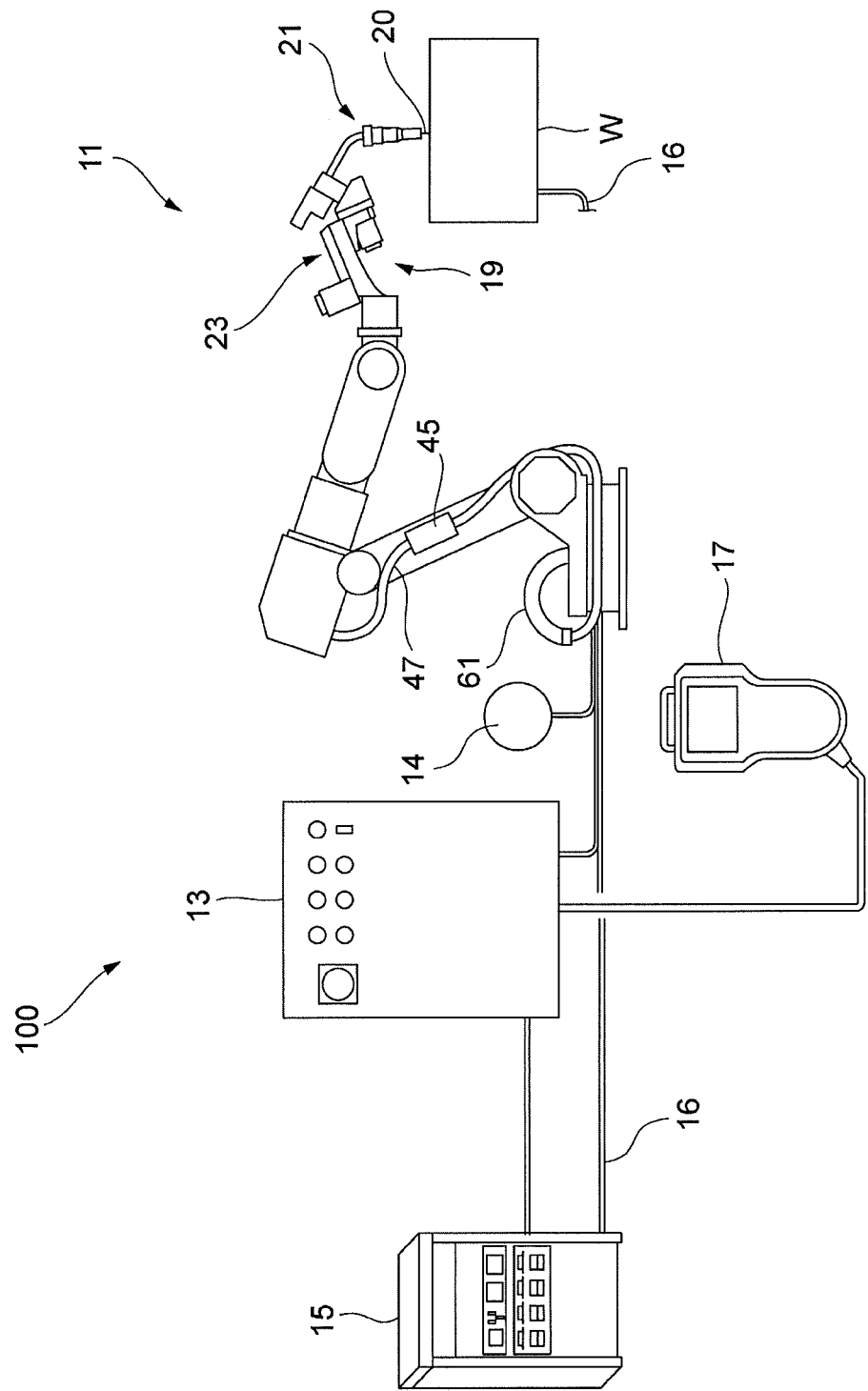
FIG. 1 is an overall configuration diagram of a welding system.

FIG. 1 is an overall configuration diagram of a welding system.

A welding system 100 is provided with a multi-jointed welding robot 11, a control device 13, a welding power source 15, a teaching controller 17, and an end effector 19 connected to a tip shaft of the multi-jointed welding robot 11. The end effector 19 has a welding torch 21, and like the illustrated example, may be provided with a two-axis weaver 23 which swings the welding torch 21 by two axes orthogonal to each other. The end effector 19 may be another tool such as a cutter, a measuring device or the like.

Welding process by the multi-jointed welding robot 11 is performed as follows: the multi-jointed welding robot 11 is driven by the control device 13 and the welding torch 21 is moved to a welding position, and welding current and arc voltage are controlled by the welding power source 15 and an arc is generated between a welding wire 20 at a tip of the welding torch 21 and a work W.

The control device 13 drives the multi-jointed welding robot 11 based on a teaching data input from the teaching controller 17. The control device 13 is a computer device whose CPU reads and executes a program stored in a storage part such as a ROM, RAM, or a hard disk, thereby controlling each part of the welding system 100.

To the tip of the welding torch 21, the welding wire 20 which is a consumable electrode such as a flux-cored wire or a solid wire is supplied by being let out of a wire pack 14 by a wire feeding device 45. Moreover, the welding power source 15 is connected to the welding torch 21 and the work W through a power cable 16. To the welding torch 21, by a command from the control device 13, welding current is supplied through the power cable arranged within the multi-jointed welding robot 11. Moreover, to the welding torch 21, shielding gas is supplied, and entrainment of air during welding is protected. Moreover, to the welding torch 21, cooling water for cooling torch is also supplied.

The control device 13 supplies, between the tip of the welding wire 20 and the work W, welding current from the welding power source 15, and generates an arc at the tip of the welding torch 21 made into a shielding gas atmosphere. Then, the welding torch 21 in which an arc is generated is moved according to the trajectory previously taught by the multi-jointed welding robot 11. Thereby, the work W is welded.

Next, the configuration of the multi-jointed welding robot 11 of the welding system 100 will be described in more detail.

Figure 2:
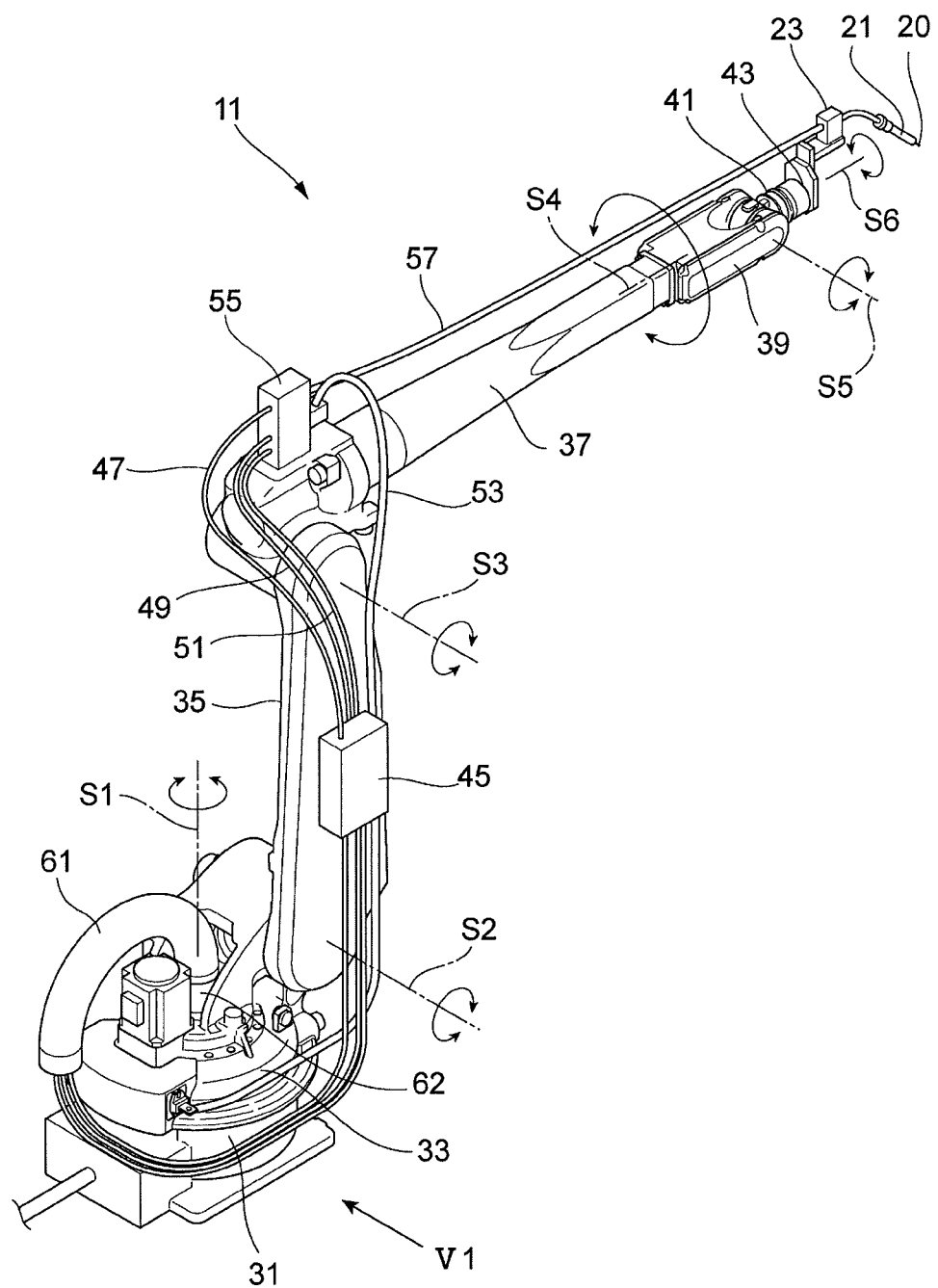
FIG. 2 is an appearance perspective view showing an example of a multi-jointed welding robot.
Figure 3:
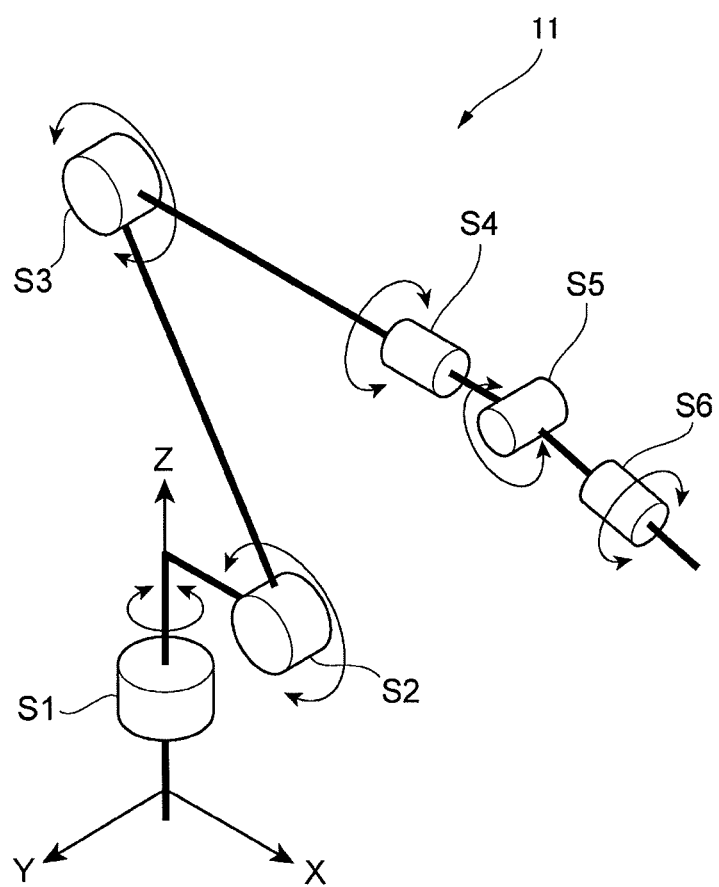
FIG. 3 is an explanatory diagram schematically showing a driving shaft of the multi-jointed welding robot shown in FIG. 2.

FIG. 2 is an appearance perspective view showing an example of the multi-jointed welding robot 11, and FIG. 3 is an explanatory diagram schematically showing a driving shaft of the multi-jointed welding robot 11 shown in FIG. 2.

The multi-jointed welding robot 11 shown here is a six-shaft robot having general six driving shafts. The multi-jointed welding robot 11 may, in addition to the illustrated six-shaft robot, for example, be a seven-shaft robot, or a multi-shaft robot having another configuration.

The multi-jointed welding robot 11 is provided with a base 31 fixed to an installation surface, a pivot part 33 provided pivotably around a first driving shaft S1 on the base 31, and a lower arm (arm part) 35 coupled to the pivot part 33 at one end portion via a second driving shaft S2 along a horizontal direction and being rotatable about the second driving shaft S2. Further, the multi-jointed welding robot 11 is provided with an upper arm (arm part) 37 connected to the other end portion of the lower arm 35 via a third driving shaft S3 parallel to the second driving shaft S2, a wrist pivot part 39 provided to the upper arm 37 and being rotatable about an arm axis by a fourth driving shaft S4, a wrist bending part 41 connected to the wrist pivot part 39 via a fifth driving shaft S5, and a wrist rotating part 43 having a sixth driving shaft S6 and connected to a tip of the wrist bending part 41. These lower arm 35, upper arm 37, wrist pivot part 39, wrist bending part 41, and wrist rotating part 43 constitute a multi-jointed arm.

The first driving shaft S1 to the sixth driving shaft S6 of the multi-jointed welding robot 11 are respectively driven by drive motors such as servomotors (not shown). To these drive motors, drive signals are respectively input from the control device 13 (see FIG. 1), and the rotation angle of each driving shaft is controlled. Thereby, the welding torch 21 can be positioned in a desired posture in an X-Y-Z space.

In addition, in the present configuration, although the above two-axis weaver 23 is attached between the welding torch 21 and the sixth driving shaft S6, which is a furthest tip shaft of the multi-jointed arm, of the wrist rotating part 43, the two-axis weaver may be omitted. The welding torch 21 in the present configuration is supported by the two-axis weaver 23 such that a torch tip is swingable in two axial directions.

On the multi-jointed welding robot 11, the wire feeding device 45 for feeding the consumable electrode (hereinafter, referred to as the welding wire 20) to the welding torch 21 is mounted. The illustrated example shows the case where the wire feeding device 45 is provided in an intermediate portion in a longitudinal direction of the lower arm 35. The wire feeding device 45 is connected to the control device 13 (see FIG. 1) by a communication line (not shown), and controls feeding of the welding wire 20 in accordance with a command signal from the control device 13. The welding wire 20 is inserted through an insertion hole of a conduit cable 47, and is fed within the insertion hole. Thereby, handling ability of the welding wire is improved while preventing damage of the welding wire 20.

The wire feeding device 45 is not only provided at the lower arm 35 as described above, but also may be provided, for example, in a position of a cable adapter 55 (see FIG. 2) described later.

The shielding gas supplied to the welding torch 21 is supplied through a gas hose 49 from a gas supply device (not shown). Similarly, the cooling water is supplied through a cooling water hose 51 from a cooling water circulation device (not shown). Moreover, the welding current output from the welding power source 15 is supplied through the aforementioned power cable 16 and a power cable 53.

Routing members such as the conduit cable 47, the gas hose 49, the cooling water hose 51, and the power cables 16, 53 are routed around the base 31 and the pivot part 33 and along the lower arm 35, up to the point of the cable adapter 55 provided in the vicinity of the third driving shaft S3 of the upper arm 37 from the base 31. In the cable adapter 55, the conduit cable 47, the gas hose 49, the cooling water hose 51, and the power cable 53 are bundled up into one torch cable 57 which is a composite cable. The torch cable 57 is routed between the cable adapter 55 and the welding torch 21.

In the multi-jointed welding robot 11 in the present configuration, the routing members including the conduit cable 47, the gas hose 49, the cooling water hose 51, and the power cable 53 are inserted in the interior of the pivot part 33 through the base 31, and are led out of an opening 62 provided in a part of the upper portion of the pivot part 33 to the outside of the pivot part 33. The opening 62 is provided at a shaft center position of the first driving shaft S1 which is a pivot center part of the pivot part 33. Then, the routing members led out of the opening 62 toward the upper side which is the opposite side to the installation surface are inserted in a guide member 61 whose one end portion 61a is attached to the opening 62.

The guide member 61 is a tubular member curved from the one end portion 61a to the other end portion 61b (see FIG. 4), and guides the inserted routing members from the one end portion 61a to the other end portion 61b. The guided routing members are led out of the other end portion 61b of the guide member 61 toward the lower side which is the installation surface side.

By the above arrangement form of the routing members, it is possible to maintain a curvature radius of the routing members to be more than acceptable minimum curvature radius so as not to impart a bending tendency thereto. For example, since a bending tendency is easy to be imparted to the welding wire inserted through the conduit cable 47, in a case where the routing member is the conduit cable 47, it is preferable that the guide member 61 in the present configuration has the minimum curvature radius of a curved shape is not less than 100 mm and not more than 350 mm. More preferable lower limit is not less than 150 mm, more preferably, not less than 200 mm, and particularly preferably, not less than 220 mm. The minimum curvature radius of the guide member 61 is not less than 100 mm which is acceptable curvature radius of a general welding wire, thereby capable of preventing a bending tendency from being imparted to the welding wire or other routing members. Moreover, the minimum curvature radius is not more than 350 mm, thereby capable of suppressing enlargement of the robot.

Next, the arrangement of the conduit cable 47 through which the welding wire is inserted will be described in more detail by use of FIG. 4 to FIG. 7.

Figure 4:
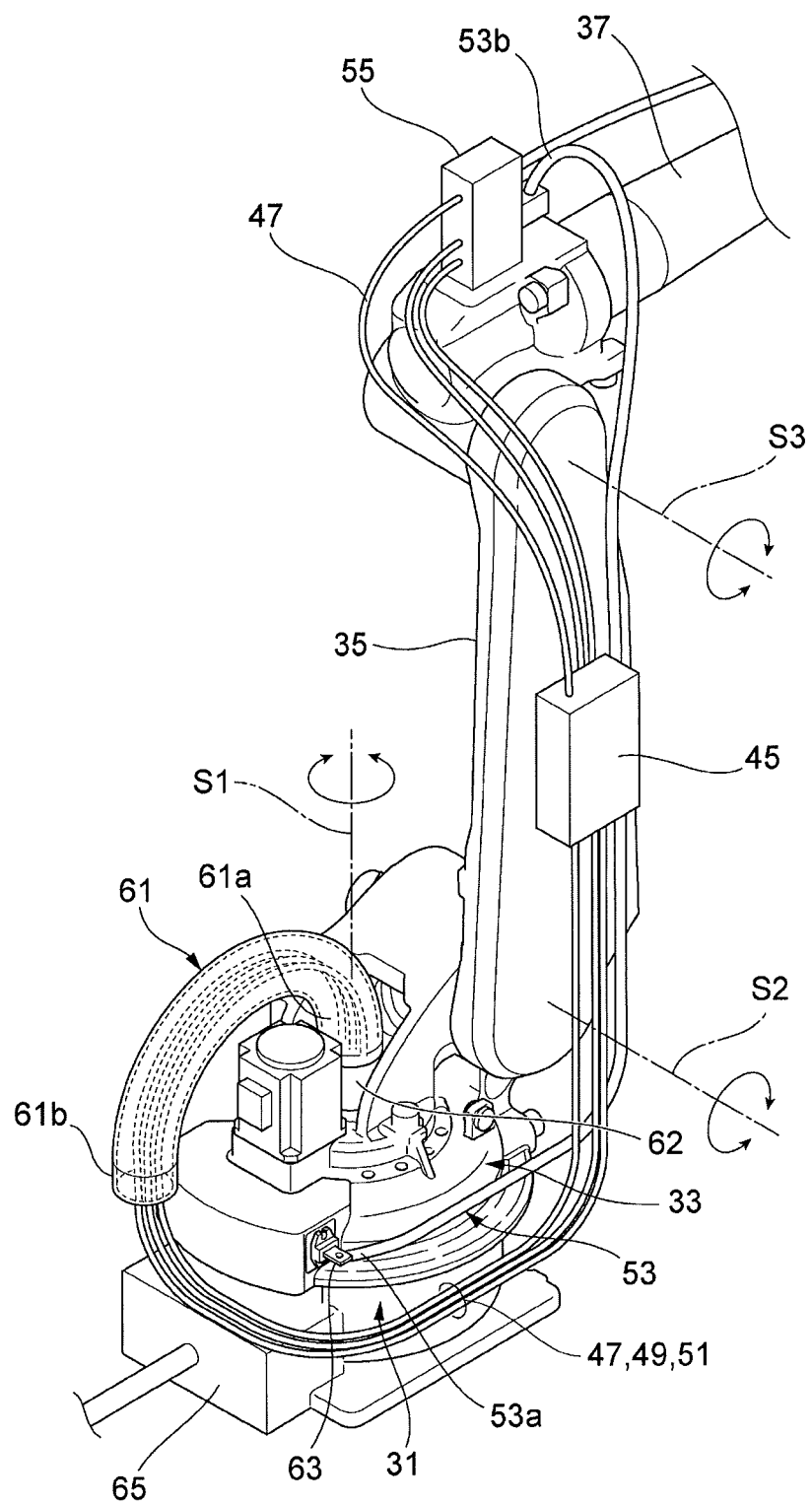
FIG. 4 is a partially enlarged view of the multi-jointed welding robot shown in FIG. 2.
Figure 5:
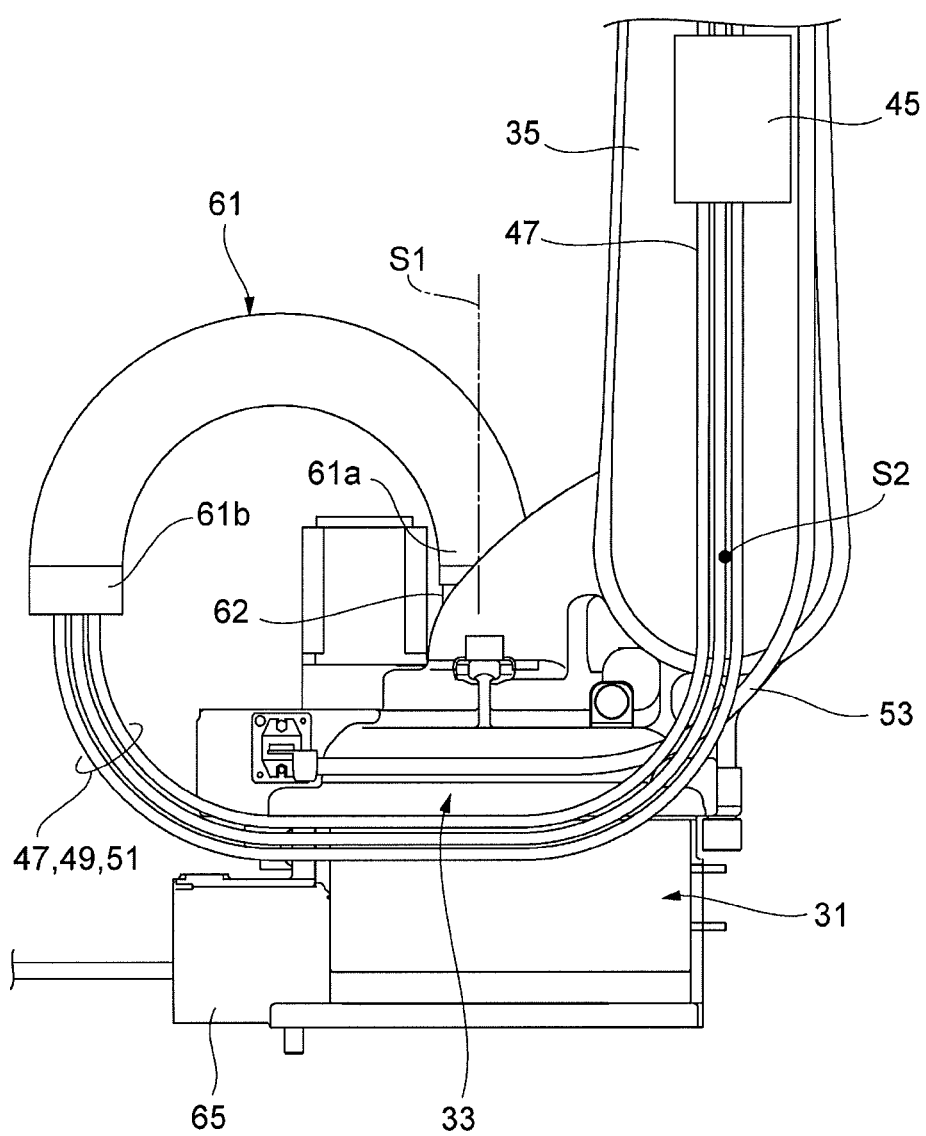
FIG. 5 is a view when the multi-jointed welding robot of FIG. 2 is seen from a V1 direction.

FIG. 4 is a partially enlarged view of the multi-jointed welding robot shown in FIG. 2, and FIG. 5 is a view when the multi-jointed welding robot 11 of FIG. 2 is seen from a V1 direction.

As shown in FIG. 4 and FIG. 5, the guide member 61 is a tubular member curved in a circular arc shape, and the one end portion 61a thereof is fixed to the opening 62 formed at the shaft center position of the first driving shaft S1 in the upper portion which is the opposite side to the installation surface of the pivot part 33. The guide member 61 is extended in a direction away from a position of the second driving shaft S2 of the lower arm 35 obliquely upward from the shaft center position of the first driving shaft S1. Then, the other end portion 61b opposite to the one end portion 61a of the guide member 61 is opened toward the lower portion which is the installation surface side.

Through the guide member 61, in addition to the conduit cable 47, between the welding torch 21 (see FIG. 1) and the base 31, the routing members including the gas hose 49 for feeding shielding gas and the cooling water hose 51 for feeding cooling water are inserted.

Moreover, the power cable 16 is connected to a terminal 63 provided at a part of the pivot part 33 through an external connection part 65 of the base 31. To the terminal 63, one end portion 53a of the power cable 53 is connected. The other end portion 53b of the power cable 53 is connected to the cable adapter 55 in the vicinity of the third driving shaft S3 of the upper arm 37. The power cable 53 between the one end portion 53a and the other end portion 53b is arranged along the pivot part 33 and the lower arm 35.

The routing members are inserted in the interior of the pivot part 33 from the external connection part 65 of the base 31. The routing members inserted in the interior of the pivot part 33 are extended to the outside of the pivot part 33 upwardly from the opening 62 provided at the shaft center position of the first driving shaft S1 of the pivot part 33. The extended routing members are led out of the other end portion 61b of the guide member 61 downwardly through the interior of the guide member 61.

The routing members led out of the other end portion 61b of the guide member 61 are arranged being circled toward the second driving shaft S2 of the lower arm 35 along the outer circumference of the first driving shaft S1 of the pivot part 33. Then, from the second driving shaft S2 to the cable adapter 55, the routing members are arranged along the longitudinal direction of the lower arm 35.

Figure 6:
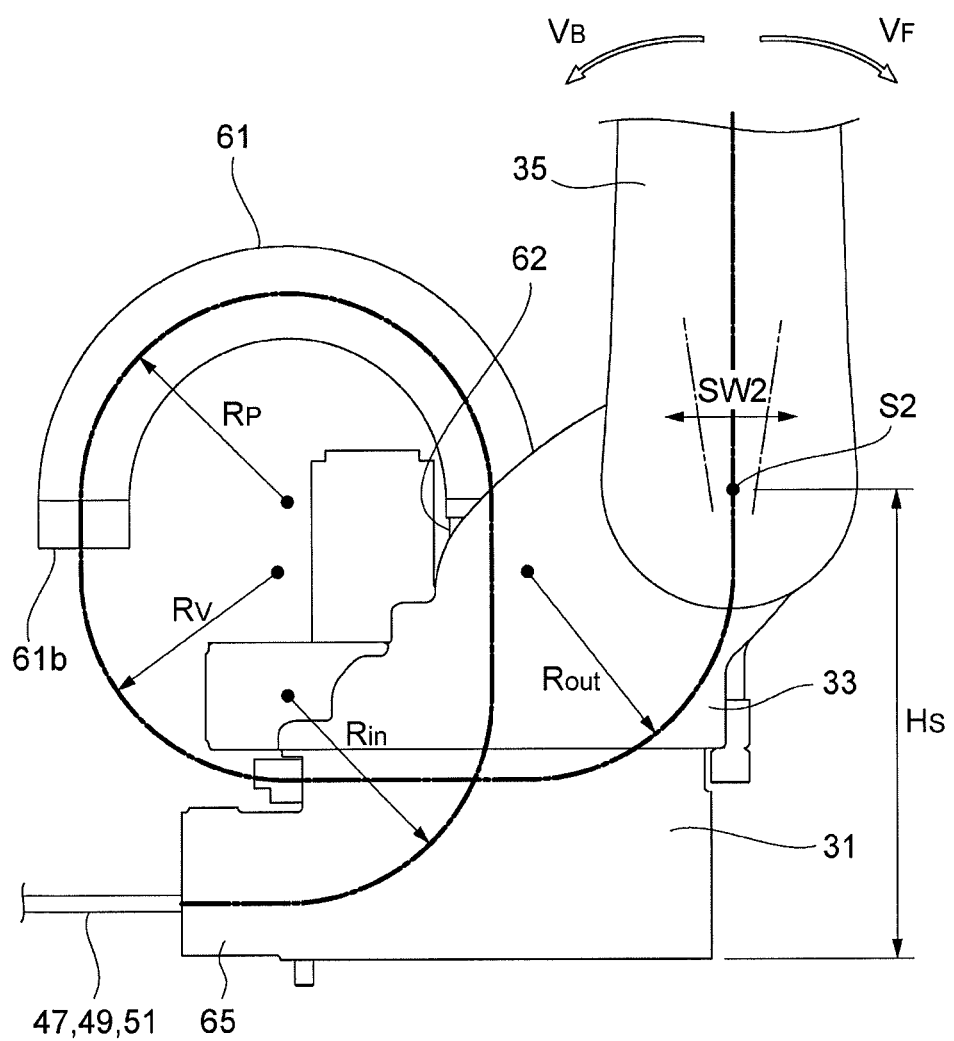
FIG. 6 is a side view of a base and a pivot part.
Figure 7:
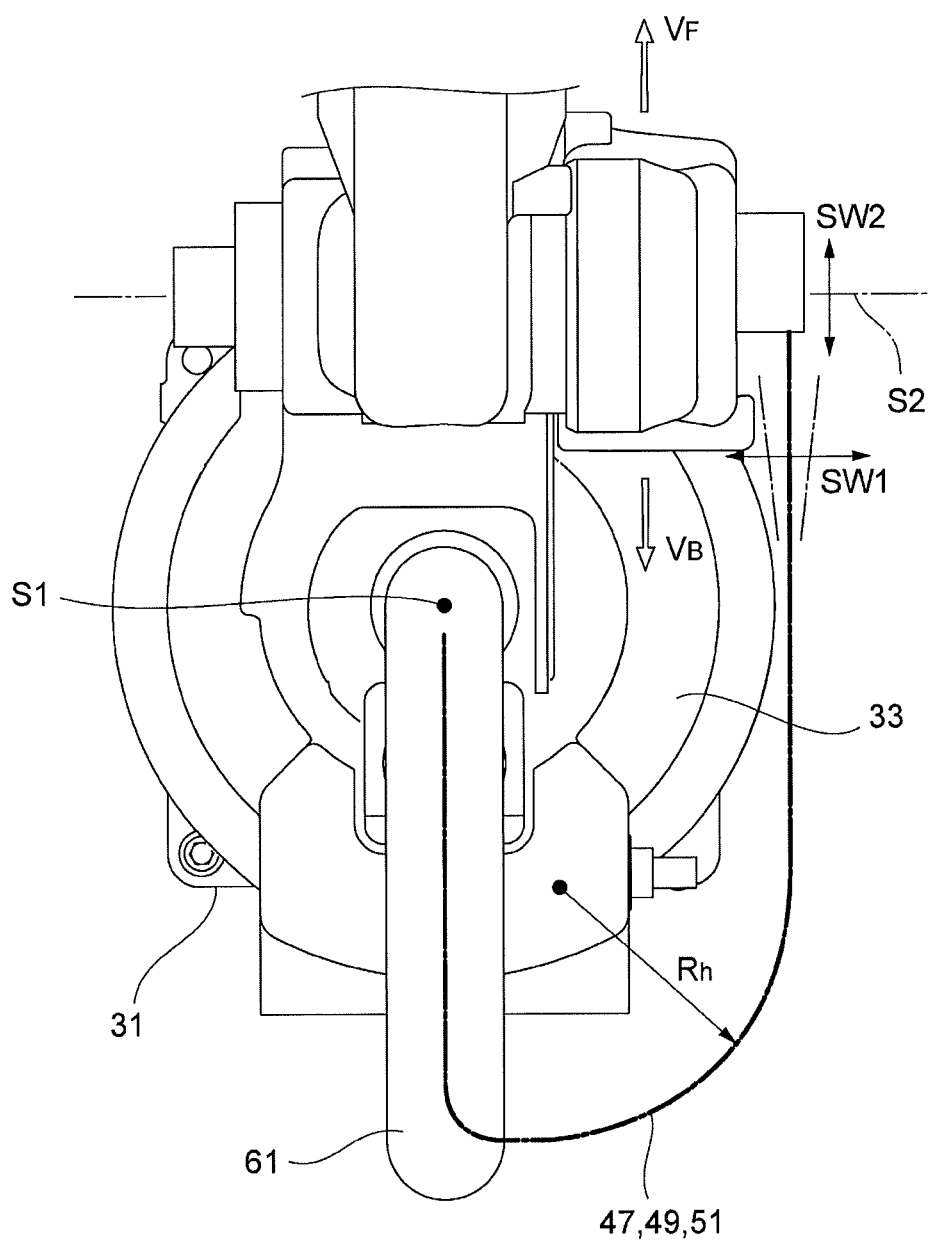
FIG. 7 is a top view of the base and the pivot part.

FIG. 6 is a side view of the base 31 and the pivot part 33, and FIG. 7 is a top view of the base 31 and the pivot part 33.

According to the above arrangement form of the routing members, as shown in FIG. 6 and FIG. 7, the routing members are curved with a curvature radius Rin toward the opening 62 from the external connection part 65 on the lateral side of the base 31 and directed upward. Then, in the interior of the guide member 61 fixed to the opening 62, the routing members are curved with a curvature radius Rp so as to be directed gradually from the upper portion to the lower portion.

The routing members extended downwardly from the other end portion 61b of the guide member 61 are arranged along the outer circumference of the pivot part 33 with a curvature radius Rv in a side view and with a curvature radius Rh in a top view. Further, in the vicinity of the second driving shaft S2 of the lower arm 35, the routing members are curved upwardly with a curvature radius Rout in a side view, and with a sway width SW1 in a direction close to or away from the pivot part 33 and a sway width SW2 in a direction orthogonal to a longitudinal axis of the lower arm 35 and the sway width SW1 in a top view.

The portion curved with the curvature radii Rv and Rh of the routing members, and the portion curved with the curvature radius Rout and being likely to generate the sway widths SW1, SW2 of the routing members are curved with a three-dimensionally gentle curvature radius by synthesizing the respective curvature radii and sway widths.

Therefore, according to the arrangement form of the routing members in the present configuration, the portion with a small curvature radius is not generated in the routing members, and a large curvature radius can be maintained throughout the routing members. Even if the lower arm 35 is driven in a forward direction VF or a backward direction VB around the second driving shaft S2, the portion with a small curvature radius is not locally generated in the conduit cable 47. That is to say, in a normal design concept, the routing members are intended to be arranged within a robot housing such as the pivot part 33 or the lower arm 35, but in the present configuration, the routing members are intentionally led out to the outside of the housing and arranged in a state of being largely curved. Thereby, compared to the configuration in which the routing members are arranged within the housing and led to an arm tip, it is possible to remarkably reduce bending or shearing acting on the routing members during driving.

Moreover, even if the pivot part 33 rotates about the first driving shaft S1, the routing members are arranged through the shaft center position of the first driving shaft S1, and therefore the routing members are merely slightly twisted, and the curvature radius thereof is not reduced. Moreover, the guide member 61 rotates integrally with the pivot part 33, and therefore a relative position of the routing members and the pivot part 33 is not affected by rotation of the pivot part 33. Thus, the conduit cable 47 through which the welding wire is inserted is not bent to less than the minimum curvature radius acceptable for the welding wire. Therefore, it is possible to certainly prevent a bending tendency from being imparted to the welding wire.

Then, the guide member 61 guides the direction of the routing member downward from upward, therefore there is no need to increase the height of the pivot part 33 so as to increase the curve of the routing members, and the height extended upwardly from the pivot part 33 is reduced. As a result, it is possible to lower a height Hs of the second driving shaft S2 from a lower surface of the base 31. When the height Hs of the second driving shaft S2 is lowered, the volumes of the base 31 and the pivot part 33 are reduced, and the weight of the whole multi-jointed welding robot 11 can be reduced. Moreover, the lower the second driving shaft S2 is, the more the degree of freedom of arrangement of the robot can be extended, and therefore, convenience of the multi-jointed welding robot 11 is increased.

In the multi-jointed welding robot 11 in the present configuration, the wire feeding device 45 is attached to the lower arm 35, thereby reducing the weight of the upper arm 37 and reducing inertia force generated during welding. Thereby, the welding torch 21 provided at a tip of the upper arm 37 can realize more accurate and fast operation.

Moreover, as to the lower arm 35, it is preferable that the routing members are arranged as close as possible to the lower arm 35 because inertia force generated in the routing members during driving of the robot can be reduced. However, in general, if the lower arm 35 is closer to a fixed position of the routing members, the routing members are easily bent with a smaller curvature radius by driving of the lower arm 35. However, according to the arrangement form of the routing members in the present configuration, even if the lower arm 35 is rotationally moved around the second driving shaft S2, the routing members are merely bent while maintaining a large curvature radius along a direction cancelling the curve or a curved direction. Therefore, the routing members are not locally bent with a small curvature radius.

As described above, the conduit cable 47 is arranged while maintaining a large curvature radius, and a bending tendency is prevented from being imparted to the welding wire. Similarly, also as to the other routing members such as the gas hose 49, the cooling water hose 51, and the power cables 16, 53, a bending tendency, damage and the like of each routing member can be prevented. Moreover, a contribution to reduction of the height Hs of the second driving shaft S2 is similarly made.

Next, the configuration of the guide member 61 will be described in more detail.

Figure 8A:
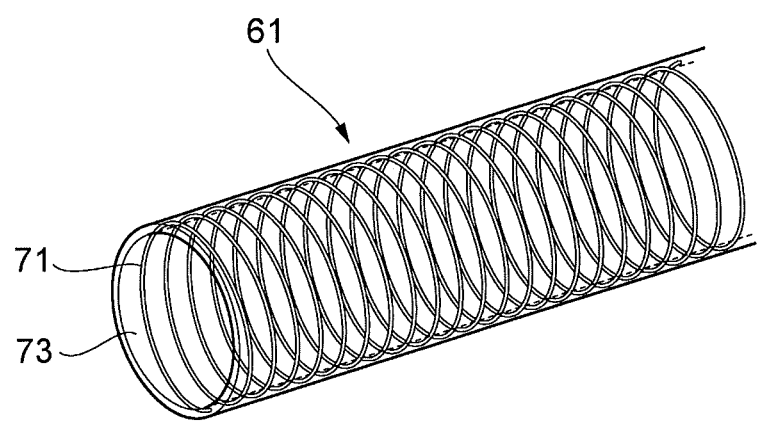
FIG. 8A is a partially enlarged perspective view of a guide member.
Figure 8B:
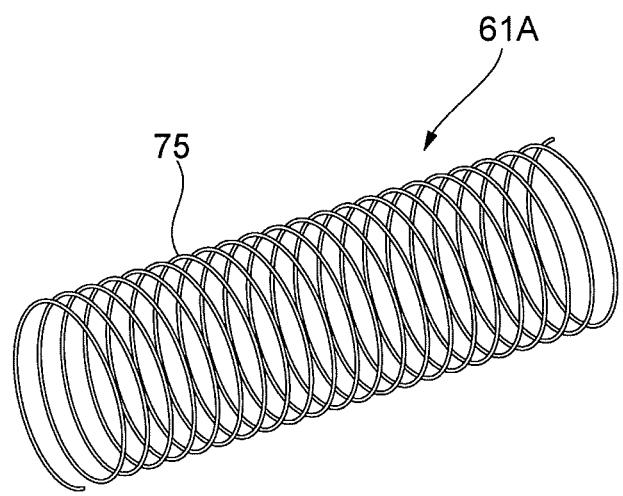
FIG. 8B is a partially enlarged perspective view showing another configuration example of the guide member.
Figure 8C:
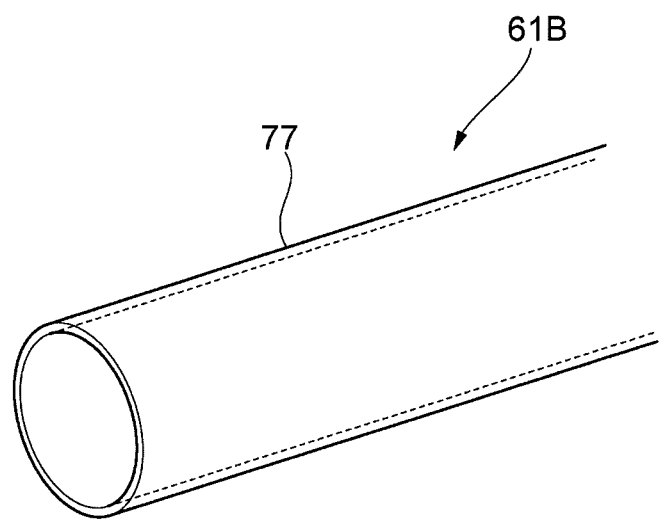
FIG. 8C is a partially enlarged perspective view showing still another configuration example of the guide member.

FIG. 8A is a partially enlarged perspective view of the guide member 61.

The guide member 61 preferably supports, without locally bending the routing member such as the conduit cable 47, the routing member in a state that the whole is largely curved. As shown in FIG. 8A, the guide member 61 can be a tubular member formed into a circular arc shape as a whole and formed by coating a metal core wire 71 in a coil form with a resin material 73. In addition, the cross-section of the guide member 61 is circular, but the shape is not limited thereto, and may be oval, rectangular or the like. Moreover, the metal core wire 71 embedded in the resin material 73 is not only formed in coil form, but also may be configured such that a lot of ring-shaped metal wires are concentrically spaced from one another.

Figure 9A:
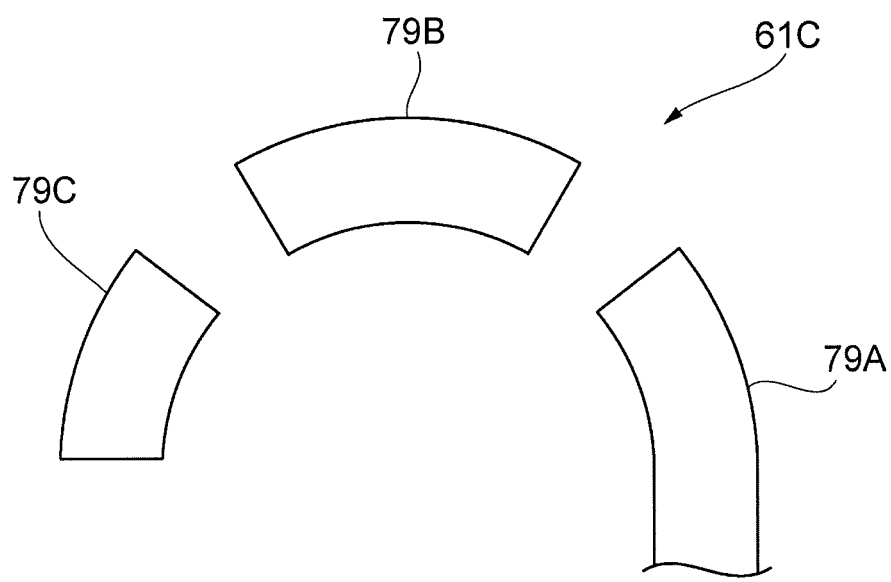
FIG. 9A is a schematic side view showing another configuration example of the guide member.
Figure 9B:
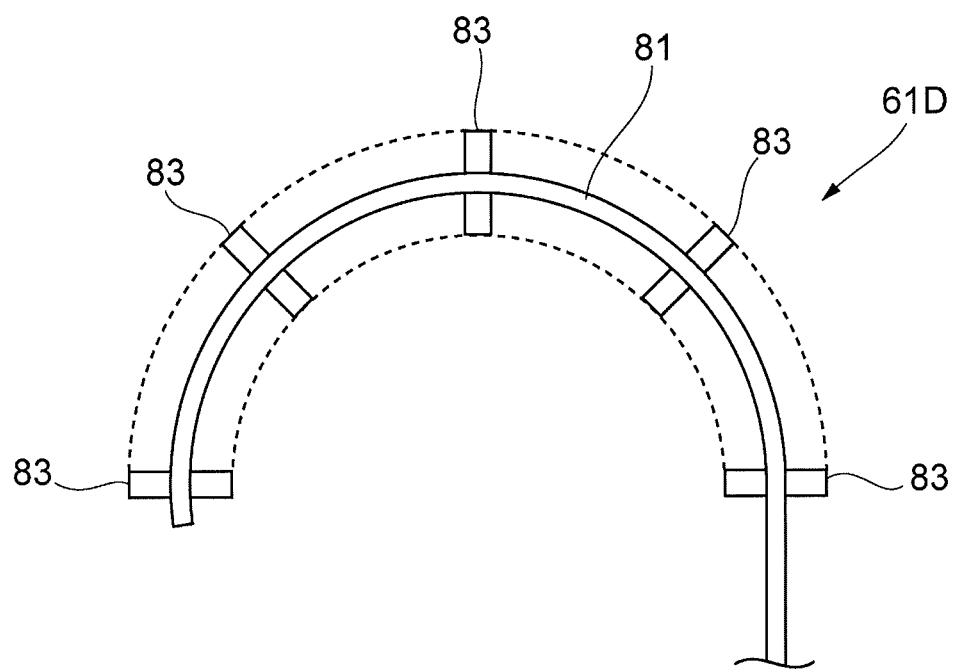
FIG. 9B is a schematic side view showing still another configuration example of the guide member.

Moreover, as shown in FIG. 9B, the guide: member may be a guide member 61D formed by providing a plurality of binding bands (binding members) 83 at a supporting member 81 curved in a circular arc shape. In that case, arbitrary curved shape can be easily formed, and the degree of freedom of the curved shape when the routing member 81 is guided is increased. The supporting member is, for example, a bar material curved in a circular arc shape.

Further, as shown in FIG. 9, in addition to the integrally molded tubular member, the guide member may be a guide member 61C consisting of a plurality of cylinder bodies 79A, 79B, 79C. The respective cylinder bodies 79A, 79B, 79C are fixed to a frame (not shown) or the like.

Moreover, as shown in FIG. 9B, the guide member may be a guide member 61D formed by providing a plurality of binding bands (binding members) 83 at a supporting member 81 curved in a circular arc shape. In that case, arbitrary curved shape can be easily formed, and the degree of freedom of the curved shape when the routing member is guided is increased. The supporting member is, for example, a bar material curved in a circular arc shape.

Next, another configuration example of the multi-jointed welding robot will be described.

FIG. 10 is a side view showing another configuration example of the multi-jointed welding robot. Here, by denoting the same members as the members shown in FIG. 2 by the same reference numerals, the description thereof will be omitted or simplified.

A multi-jointed welding robot 11A in the present configuration has the same configuration as the aforementioned multi-jointed welding robot 11, except that a torch cable 57A connected to the welding torch 21 is arranged while further extending to the base 31 from the cable adapter 55.

The torch cable 57A used here is a composite cable formed by bundling up the routing members consisting of a plurality of cables and hoses including the conduit cable 47 connected to the base 31 into one cable and coating it. In addition, a conduit wire accommodated in the torch cable 57A and extended from the base 31 is connected to the wire pack 14 shown in FIG. 1. Then, a signal wire or the like extended from the base 31 is connected to the control device 13 via a harness for robot control.

Figure 11:
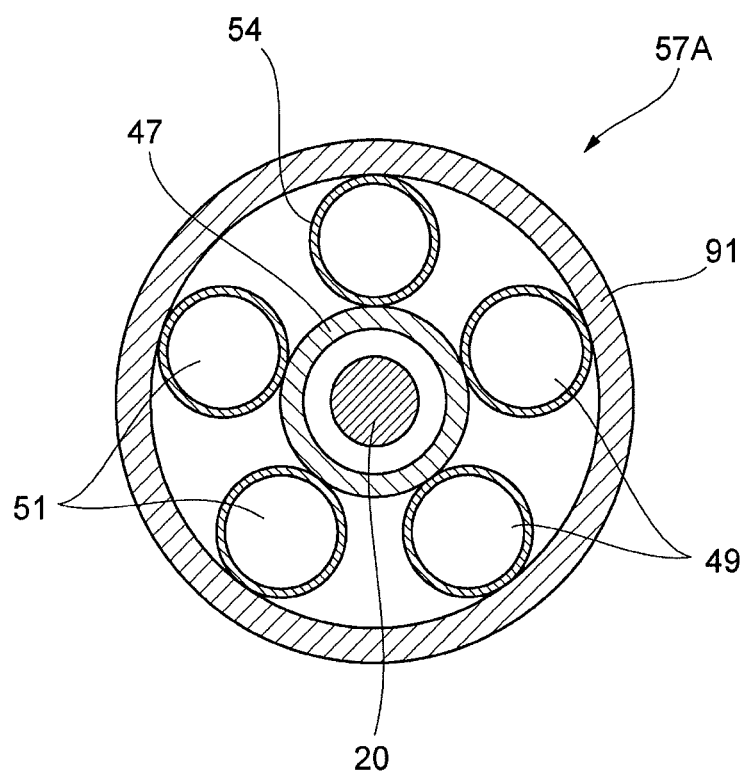
FIG. 11 is a cross-sectional view as an example of a torch cable.

FIG. 11 is a cross-sectional view as an example of the torch cable 57A.

In the torch cable 57A in the present configuration, the conduit cable 47 through which the welding wire 20 is inserted is arranged in the center of the cable, and around the conduit cable 47, the power cable 54, the gas hose 49, the cooling water hose 51 and the like are arranged. These cables and hoses are coated with a coating material 91 and constitute a composite cable.

According to the multi-jointed welding robot 11A in the present configuration, the one torch cable 57A is merely arranged from the base 31 to the welding torch 21, so the wiring structure can be simplified. Moreover, a centrifugal force generated during operation of the robot can be reduced compared to the case where a lot of cables and hoses coexist. Therefore, the configuration is advantageous for high-speed operation of the robot, and higher responsibility is realizable.

Figure 12B:
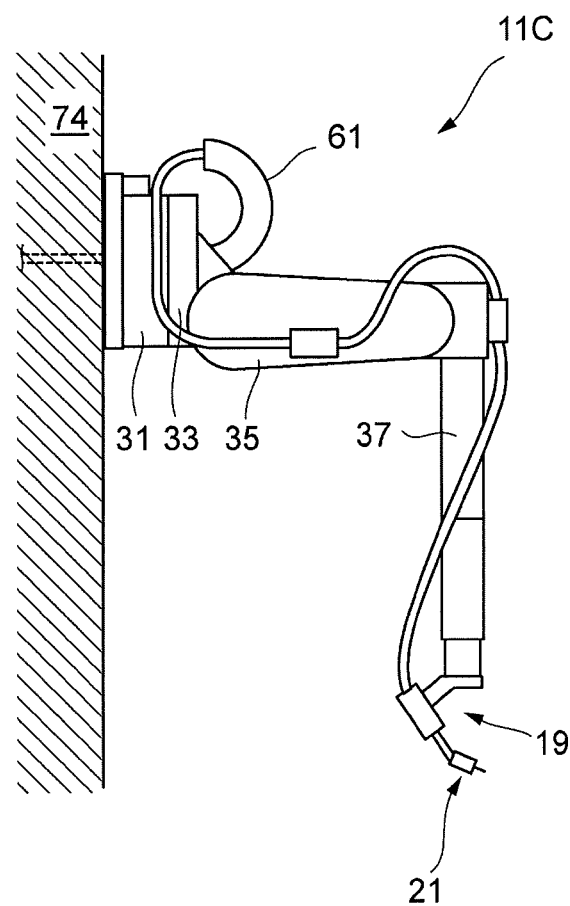
FIG. 12B is a side view of the multi-jointed welding robot installed on a wall surface.

Moreover, the above described multi-jointed welding robots 11, 11A are both installed by fixing the base 31 to a horizontal floor surface, but the arrangement form is not limited thereto. For example, as shown in FIG. 12A, the multi-jointed welding robot may be arranged like a multi-jointed welding robot 11B arranged in such a manner that the base 31 is fixed to a ceiling 72 and the multi-jointed arm is suspended from the ceiling 72. Moreover, as shown in FIG. 12B, the multi-jointed welding robot may be arranged like a multi-jointed welding robot 11C arranged in such a manner that the base 31 is fixed to a wall surface 74 provided in a standing manner from the floor surface and the multi-jointed arm is attached to the wall surface 74. In either arrangement forms, the operation and effect as before are obtained.

As thus described, the present invention is not limited to the above embodiment. Combinations of the respective configurations of the embodiment, and alternations or applications by those skilled in the art, which are based on the description of the specification and well-known techniques, are scheduled by the present invention and included in the scope to be protected.

For example, in the configurations of the above multi-jointed welding robots 11, 11A, the opening 62 of the pivot part 33 is provided in the pivot center part which is the shaft center position of the second driving shaft S2, but the pivot center part doesn't have to be a strict shaft center position. That is to say, the pivot center part includes, during pivot motion of the pivot part 33, a position deviated from the shaft center position in a range where the curvature radius of the routing member such as the conduit cable 47 falls within an acceptable range.

Moreover, the guide member 61 may be, in addition to a tubular member, configured by combining plate materials, and may support the routing members with strings, pins or the like as long as the curve of the routing members can be kept.

The present patent application is based on Japanese Patent Application (Japanese Patent Application No. 2017-17109) filed on Feb. 1, 2017, the entire contents of which are incorporated herein by reference.

EXPLANATION OF REFERENCE NUMERALS

11, 11A multi-jointed welding robot
16, 53, 54 power cable (routing member)
31 base
33 pivot part
35 lower arm (arm part)
37 upper arm (arm part)
47 conduit cable (routing member)
49 gas hose (routing member)
51 cooling water hose (routing member)
57 torch cable 57 A torch cable (routing member)
61, 61A, 61B guide member
61a one end portion
61b the other end portion
100 welding system

The invention claimed is:
1. A multi-jointed welding robot, having:
a pivot part pivotably provided on a base fixed to an installation surface;
a multi-jointed arm coupled to the pivot part via a driving shaft and having a plurality of arm parts;
routing members routed in an interior of the pivot part and extending to the multi-jointed arm, wherein the pivot part is provided with an opening through which routing members are led out of the pivot part in a direction away from the installation surface; and
a guide member for curving the routing members that have been led out of the pivot part, the guide member having one end portion fixed to the opening and into which the routing members led out of the opening of the pivot part are introduced, the guide member further having an other end portion through which the routing members exit the guide member in a direction toward the installation surface,
wherein the guide member comprises at least one tubular member curved in a circular arc shape having a minimum radius predetermined to prevent a bending tendency from being imparted to a welding wire,
wherein the wide member has a predetermined minimum radius of curvature being between 100 mm or more and 350 mm or less,
wherein the routing members, at a position that passes through the base to enter into the guide member, have a predetermined minimum radius of curvature,
wherein the routing members, at a position where the routing members extend out from the guide member toward the base and along an outer periphery of the pivot part, have a predetermined minimum radius of curvature, and
wherein the routing members, at a position from the pivot part to along an arm portion, have a predetermined minimum radius of curvature.

2. The multi-jointed welding robot according to claim 1, wherein the guide member includes a supporting member curved in a circular arc shape, and a binding member which is fixed to the supporting member and binds the routing members.

3. The multi-jointed welding robot according to claim 1, wherein the guide member is fixed to a pivot center part of the pivot part at the one end, portion thereof.

4. The multi-jointed welding robot according to claim 3, wherein the routing members include the welding wire inserted through a conduit cable.

5. The multi-jointed welding robot according to claim 3, wherein the routing members include, between a welding torch provided at a tip of the multi-jointed arm and the pivot part, at least any of a gas hose for supplying shielding gas, a cooling water hose for supplying cooling water, and a power cable for supplying welding current, and are inserted through one torch cable.

6. The multi-jointed welding robot according to claim 1, wherein the routing members include Hai the welding wire inserted through a conduit cable.

7. The multi-jointed welding robot according to claim 6, wherein the routing member include, between a welding torch provided at a tip of the multi-jointed arm and the pivot part, at least any of a gas hose for supplying shielding gas, a cooling water hose for supplying cooling water, and a power cable for supplying welding current, and are inserted through one torch cable.

8. The multi-jointed welding robot according to claim 1, wherein the routing members include, between a welding torch provided at a tip of the multi-jointed arm and the pivot part, at least any of a gas hose for supplying shielding gas, a cooling water hose for supplying cooling water, and a power cable for supplying welding current, and are inserted through one torch cable.

9. A multi-jointed welding robot, having:
a pivot part pivotably provided on a base fixed to an installation surface;
a multi-jointed arm coupled to the pivot part via a driving shaft and having a plurality of arm parts;
routing members routed in an interior of the pivot part and extending to the multi-jointed arm, wherein the pivot part is provided with an opening through which routing members are led out of the pivot part in a direction away from the installation surface; and
a guide member for curving the routing members that have been led out of the pivot part, the guide member having one end portion fixed to the opening and into which the routing members led out of the opening of the pivot part are introduced, the guide member further having an other end portion through which the routing members exit the guide member in a direction toward the installation surface,
wherein the guide member comprises at least one tubular member curved in a circular arc shape having a minimum radius predetermined to be equal to or greater than a radius preventing a bending tendency from being imparted to a welding wire,
wherein the guide member has a predetermined minimum radius of curvature being between 100 mm or more and 350 mm or less,
wherein the routing members, at a position that passes through the base to enter into the guide member, have a predetermined minimum radius of curvature that is no less than said radius preventing a bending tendency from being imparted to a welding wire,
wherein the routing members, at a position where the routing members extend out from the guide member toward the base and along an outer periphery of the pivot part, have predetermined minimum radius of curvature that is no less than said radius preventing a bending tendency from being imparted to the welding wire, and
wherein the routing members, at a position from the pivot part to along an arm portion, have a predetermined minimum radius of curvature that is no less than said radius preventing a bending tendency from being imparted to the welding wire.

* * * * *